US011829649B2

(12) United States Patent
Beckman

(10) Patent No.: US 11,829,649 B2
(45) **Date of Patent: *Nov. 28, 2023**

(54) DATA STORAGE DEVICE USING AN EXTERNAL REFERENCE PATTERN

(71) Applicant: Christopher V. Beckman, Miami, FL (US)

(72) Inventor: Christopher V. Beckman, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/963,974

(22) Filed: Oct. 11, 2022

(65) Prior Publication Data

US 2023/0030591 A1 Feb. 2, 2023

Related U.S. Application Data

(63) Continuation of application No. 16/808,361, filed on Mar. 3, 2020, now Pat. No. 11,467,771, which is a continuation-in-part of application No. 15/421,419, filed on Jan. 31, 2017, now Pat. No. 10,579,292, which is a continuation-in-part of application No. 14/216,337, filed on Mar. 17, 2014, now Pat. No. 9,558,217.

(60) Provisional application No. 61/852,147, filed on Mar. 15, 2013.

(51) Int. Cl.

| | |
|---|---|
| ***G06F 16/00*** | (2019.01) |
| ***G06F 3/06*** | (2006.01) |
| ***G06Q 30/0283*** | (2023.01) |
| ***G06F 16/215*** | (2019.01) |

(52) U.S. Cl.
CPC .......... *G06F 3/0659* (2013.01); *G06F 3/0607* (2013.01); *G06F 3/0673* (2013.01); *G06F 16/215* (2019.01); *G06Q 30/0283* (2013.01)

(58) Field of Classification Search
CPC .... G06F 3/0659; G06F 3/0607; G06F 3/0673; G06F 3/0608; G06F 3/0661; G06F 16/215; G06Q 30/0283
See application file for complete search history.

(56) References Cited

U.S. PATENT DOCUMENTS 5,721,878 A * 2/1998 Ottesen .............. G11B 20/1254 725/87
5,765,200 A * 6/1998 McIlvain .............. G06F 3/0622 703/24
8,166,217 B2 * 4/2012 White ................... G06F 3/0607 710/66

(Continued)

*Primary Examiner* — Alexander Khong

(57) ABSTRACT

New, more efficient and robust data storage devices, systems and techniques are provided. In some aspects of the invention, a new form of data storage device is provided, incorporating data storage cells, and a read/write device connected with an auxiliary structure. The auxiliary structure elaborates on the simpler data written in the data storage cells to generate more complex, complete and meaningful data. In some embodiments, the physical arrangement, or other attributes, of structural storage device elements serve as a patterned reference device for data enhancement and supplementation. In some embodiments, the data enhancement and supplementation results from one or more chemical and/or physical reactions, in a sequence of such reactions, between writeable domains, auxiliary structure or the simpler data.

20 Claims, 12 Drawing Sheets

(56) References Cited

U.S. PATENT DOCUMENTS

| | | | | |
|---|---|---|---|---|
| 2007/0272754 | A1* | 11/2007 | Lackemann | G06K 7/10722<br>235/462.11 |
| 2009/0043771 | A1* | 2/2009 | Basler | G06F 11/263 |
| 2014/0059405 | A1* | 2/2014 | Syu | G06F 11/1072<br>714/773 |

* cited by examiner

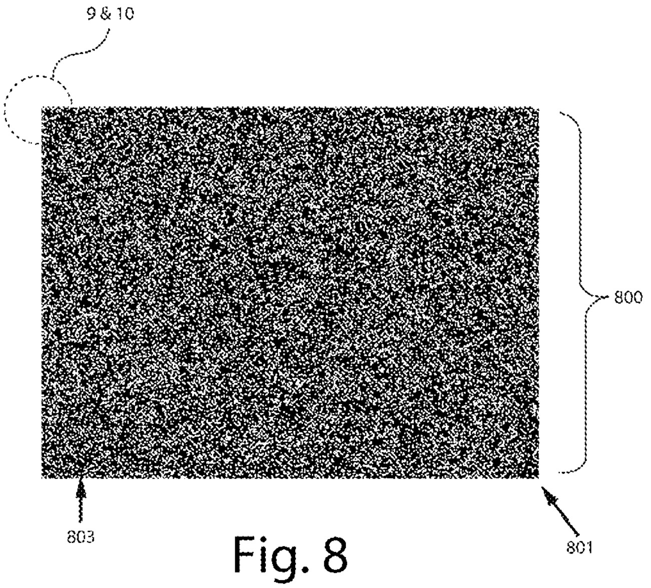
Fig. 8
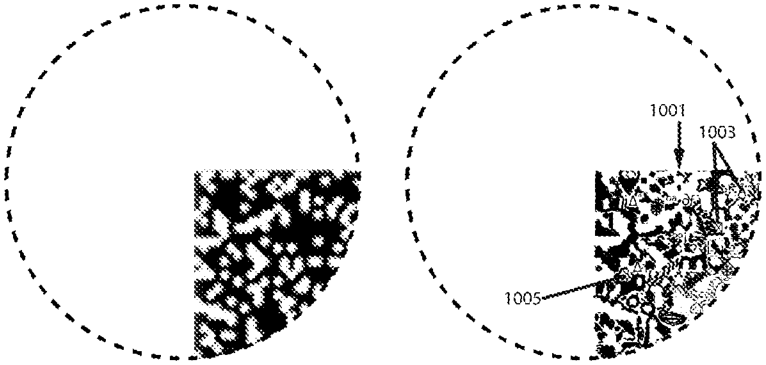
Fig. 9
Fig. 10

1103
```
01001010 01101000 00000001 11000110 11011011 11000001 00011000 00010001
11111101 00100001 00001000 01110011 10110110 10110010 10111011 00011010
00100001 11111101 00111001 00011110 00011101 00011001 11000100 11110101
00110110 00101101 10111110 01111111 01010000 10100001 11110110 01101100
10011011 01111000 00001110 11101111 11000110 10110010 10010101 11000100
01101011 11001010 11110000 00110111 11000010 11110101 01100101 11110011
01100001 11101111 01001000 10010111 10000101 01101100 01110011 00110101
11001011 00100100 01010000 00101001 10101111 11011011 00001011 01000001
10000101 11001101 00000110 00001001 01001001 01100010 10110101 01001111
11000010 11100001 01110011 10010011 00111100 00111001 11000010 00111101
11111010 11001011 10110001 00111001 00101010 01001011 01000010 01111110
```
1101
Fig. 11
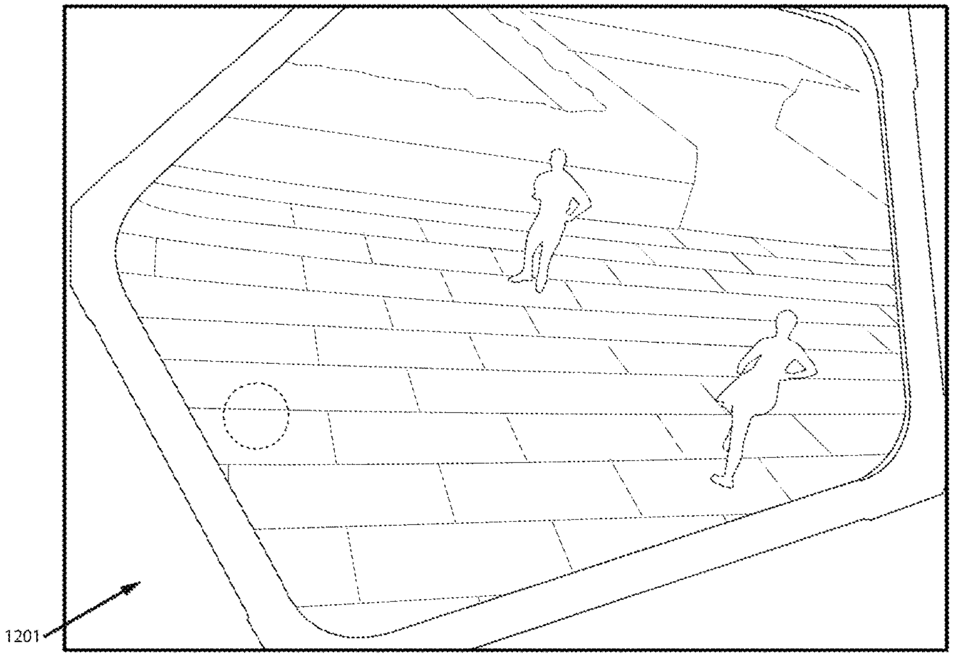
Fig. 12
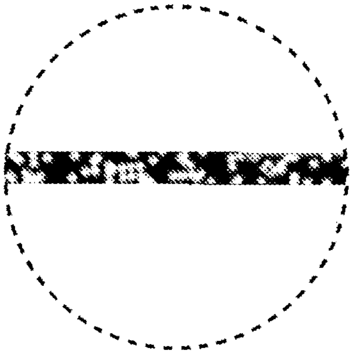
Fig. 13
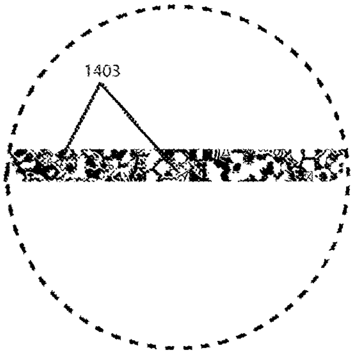
Fig. 14

DATA STORAGE DEVICE USING AN EXTERNAL REFERENCE PATTERN

CROSS-REFERENCE TO RELATED APPLICATIONS

This application is a continuation of U.S. patent application Ser. No. 16/808,361, filed Mar. 3, 2020, titled "Data Storage with Reference to an Auxiliary Pattern," now U.S. Pat. No. 11,467,771, which is a continuation-in-part of U.S. patent application Ser. No. 15/421,419, filed Jan. 31, 2017, titled "Data Elaboration by Domain Interaction with Surrounding Media Structures," now U.S. Pat. No. 10,579,292, which is a continuation-in-part of U.S. patent application Ser. No. 14/216,337, filed Mar. 17, 2014, titled "Data Storage Devices Based on Supplementation," now U.S. Pat. No. 9,558,217, which claims the benefit of U.S. Provisional Application No. 61/852,147, filed Mar. 15, 2013, titled "Computer Science Provisional I," the entire contents of all which applications are hereby incorporated by reference into the present application in their entireties.

FIELD OF THE INVENTION

The present invention relates to computer memory hardware and systems.

BACKGROUND OF THE INVENTION

Artificial methods of data storage have existed for millennia, dating at least from the time of cave paintings and tallying by marking sticks approximately 40,000 years ago. Systematic data storage using standardized symbols—for example, writing on clay tablets—dates at least from Ancient Sumer in the third millennium B.C.E. More recently, data storage using computers has arisen, now predominantly in a digital format involving the serial storage and retrieval of bits of data.

Data storage hardware currently varies depending on whether it is used for short-term or long-term functions, and a more or less volatile, fast or dense storage type may be used for those functions. Many seek a universal memory device, fulfilling both long- and short-term functions needed for computing, to eliminate the cost of manufacturing multiple devices using different technology.

It should be understood that the disclosures in this application related to the background of the invention in, but not limited to, this section titled "Background," are to aid readers in comprehending the invention, and do not set forth prior art or other publicly known aspects affecting the application; instead the disclosures in this application related to the background of the invention comprise details of the inventor's own discoveries, work and work results, including aspects of the present invention. Nothing in the disclosures related to the background of the invention is or should be construed as an admission related to prior art or the work of others prior to the conception or reduction to practice of the present invention.

SUMMARY OF THE INVENTION

New, more efficient and robust data storage devices and techniques are provided. In some aspects of the invention, a new form of data storage device is provided, incorporating storage units with simple writeable domains, and a readable conditioning structure positioned around the units. The readable structure elaborates the simpler data written in the domains to generate more complex and complete data sets. In some embodiments, the physical arrangement, or other attributes, of structural storage device elements may serve as the patterned reference device for data enhancement and supplementation.

In other aspects of the invention, a new supplementation-based media and system are provided. A local file and control system with general and specific identification attributes and management-related programming comprises a data density distribution that varies depending on media depth (immediacy, probability of access, and other factors). A remote supplementation source and control system are also provided in a common network (such as the internet) with the local control system. The local control system reports local file attributes, authorization and factors impacting media depth in real time, and the supplementation source and/or control system deliver both permanent and streaming data corrections, supplementation and format updates to the local control system and/or a Consumption Feed.

In other aspects of the invention, specialized patterns in a reference media or file are used in a new technique for data storage. By defining and recording pattern matches and other comparisons with the reference media or file, new data can be stored more efficiently in some contexts than with literal, bit-by-bit storage alone. In some embodiments, a control system comprising computer hardware builds a relational context and comparison library between the reference media or file and newly input data, and stores new data at least in part based on its relationship to the reference media or file. These aspects may be used in conjunction with the supplementation-based methods discussed above, to build a very storage-space-efficient data distribution, by prioritizing the storage of data by matches and other relationships to the separate reference media or file. Devices implementing this design to store data require very little space, albeit with some incompleteness and inaccuracies absent supplementation, but which incompleteness and inaccuracies can be quickly completed and otherwise improved by the remote supplementation source and control system, and/or a conventional digital media data storage device.

The storage methods of the present invention may be used in a wide variety of data storage platforms, while generating short-, medium- and long-term speed improvements and space efficiencies, but several specialized devices, optimizing the use of the methods, are also provided. For example, in some aspects, the relative 3-dimensional arrangement and orientation of storage elements itself provides a data pattern serving as a reference pattern or direct data storage technique.

Canons of Construction and Definitions

Where any term is set forth in a sentence, clause or statement ("statement"), each possible meaning, significance and/or sense of any term used in this application should be read as if separately, conjunctively and/or alternatively set forth in additional statements, as necessary to exhaust the possible meanings of each such term and each such statement.

It should also be understood that, for convenience and readability, this application may set forth particular pronouns and other linguistic qualifiers of various specific gender and number, but, where this occurs, all other logically possible gender and number alternatives should also be read in as both conjunctive and alternative statements, as if equally, separately set forth therein.

"Media Depth," in addition to its ordinary meaning and special meaning in the art to which it pertains, means, with respect to a data storage media or file aspect or a represented manifestation of such an aspect, the probability that the aspect or manifestation will be accessed or required for use, or the imminence of the aspect or manifestation being accessed or required for use, or both the probability and imminence of the aspect or manifestation being accessed or required, each of which may be weighted or otherwise included in a function along with other factors, including but not limited to the proximity and status of other related media, file(s), manifestations, or other computing aspects, and an assessed cost of failed or incomplete access or availability of the media aspect.

"Consumption Feed," in addition to its ordinary meaning and special meaning in the art to which it pertains, means content or a stream of content, including but not limited to video, audio, documentary or other content from media, delivered or otherwise manifested in a form for use by a user.

"Manifestation Unit," in addition to its ordinary meaning and special meaning in the art to which it pertains, means a unit of content or other data being used, including but not limited to video, audio, documentary or other content from media, requiring a given content delivery system resource unit, such as a unit of time or processor power, to deliver for consumption or other use.

BRIEF DESCRIPTION OF THE DRAWINGS

FIG. 8 depicts another exemplary random pattern of a reference media device or file used for facilitating data storage and access, in accordance with aspects of the present invention.

FIG. 9 is a portion of view 8 described in FIG. 8, above, enlarged for magnification purposes, and showing a random small-scale pattern with no further structure than that depicted in FIG. 8.

FIG. 10 is a portion of view 9 described in FIG. 8, above, enlarged for magnification purposes, and showing a non-random small-scale pattern with an embedded structure of greater complexity than that viewable in FIG. 8.

FIG. 11 depicts an exemplary random sequence of binary digits, such as the examples shown as, as may be present in a reference media device or file used for facilitating data storage and access, in accordance with aspects of the present invention.

FIG. 12 depicts a non-random image of a reference media device or file used for facilitating data storage and access, in accordance with aspects of the present invention.

FIG. 13 is a portion of view 13 described in FIG. 12, above, enlarged for magnification purposes, and showing a random small-scale pattern with no further structure than that depicted in FIG. 12.

FIG. 14 is a portion of view 14 described in FIG. 12, above, enlarged for magnification purposes, and showing a non-random small-scale pattern with an embedded structure of greater complexity than that viewable in FIG. 12.

DETAILED DESCRIPTION OF THE INVENTION

Figure 1:
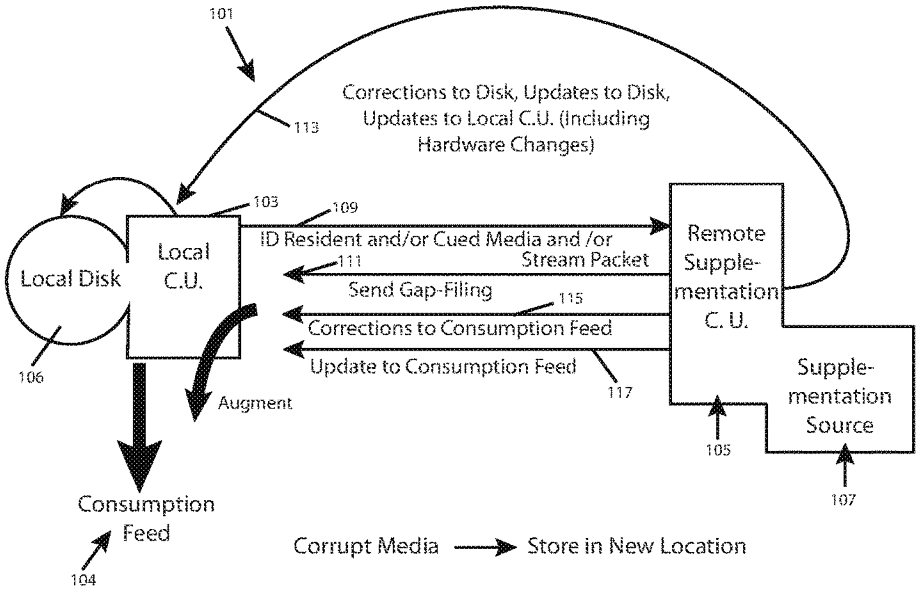
FIG. 1 is a schematic block diagram of some elements of an exemplary supplementation system for data storage and distribution in accordance with aspects of the present invention.

FIG. 1 is a schematic block diagram of some elements of an exemplary supplementation system 101 for data storage and distribution in accordance with aspects of the present invention. A local control unit 103, which may be or comprise a control system such as that set forth in reference to FIG. 15, below, summons or implements a data file to deliver content to users of the local control unit 103. For example, a user may be using such a local control unit 103 as part of a smart TV or other computerized media console connected to the internet to receive a Consumption Feed 104, such as a movie presented on the media console. Local control unit 103 is connected to a local data storage device 106, such as a computer hard disk. As will be explained further in this application, control unit 103 may present the consumption feed 104 to a user as a product of both: (1) a specialized local file designed for supplementation and (2) supplementation from a remote source, in accordance with aspects of the present invention. Such a specialized local file may be stored on local storage device 106. Local control unit 103 is connected (for example, via an internet connection) to another control unit, namely remote control unit 105, which provides specialized supplementation data in accordance with aspects of the present invention, for example, from a supplementation source 107, such as files stored on a storage device connected with control unit 105.

First, as shown by data flow arrow 109, local control unit 103 may first determine that a user has initiated a Consumption Feed related to the specialized local file on local storage device 106 and send identification (and, in some embodiments, authorization) information to remote unit 105. In addition, local control unit 103 may send a sample or a complete rendering of the data, or an initial set of data, to be manifest or consumed in the Consumption Feed 104, to the extent that that data is available on the local file, in data flow 109. Remote unit 105 may then verify the authentication and identification information, if provided by local unit 103 and, depending on that verification if performed, analyze and evaluate the sample or other data provided by local unit 103. As part of that analytical and evaluation process, remote unit 105 may determine that parts or other aspects of the data provided are inaccurate, incomplete, or subject to improvements or other updates. If so, remote unit 105 then completes the missing or otherwise needed data by sending a data supplementation stream, for example, such as that depicted by data flow arrow 111, to fill in, refine, complete or otherwise improve Consumption Feed 104. In some embodiments, the amount or degree of such improvements may depend on current Media Depth associated with the data analyzed and evaluated from data flow 109. For example, remote unit 105 may provide that data necessary, or at a necessary rate, to maintain an optimal data distribution in a local file or Consumption Feed stored or delivered by local control unit 103. Such data distributions according to Media Depth are discussed in greater detail below, in reference to FIG. 2. Some of the data flow 111 may be directly combined with data from the local file and/or presented or manifest in Consumption Feed 104—updating, completing or otherwise improving the consumed media or manifestation of the media. However, if remote unit 105 determines that there is an error in the local file, or that the local file or control unit will benefit from updates, gap-filling or other changes (including, in some embodiments, hardware changes that may be directed or carried out by remote unit 105), then commands, data delivery, rebuilding or other actions may be carried out with respect to local disk 106 and local control unit 103, as shown by flow arrow 113. In addition, and preferably after data supplementation flow 111, remote unit 105 carries out more minor corrections to data provided in the consumption feed to the user, as shown by data flow arrow 115. If more serious errors are present, however—such as large scratches that interfere with proper play of the consumption feed—in some embodiments, data flow 115 may take an equal or higher priority in comparison to flow 111. Finally, remote unit 105 may update the data provided to the user in the Consumption Feed. For example, if a format quality update has become available (such as an increased video resolution level), the remote unit may instruct the local unit to replace lower resolution data with higher resolution data according to an update, as shown in data flow arrow 117. In some embodiments, the update data may be provided with reference to the existing data on the local disk. For example, if the local disk defines a particular pixel at a lower resolution, the updated data may define several new pixels in reference to the qualities of the pixel replaced. In this way, the update may be provided in a faster, more efficient manner and provide a smoother experience for the consumer.

If remote unit 105 determines that an error has occurred, and issues a correction to local disk 106, it may also, or local control unit 103 may, restore the file or a part comprising the erroneous file section, in a new area, to reduce the risk of a repeated data corruption from hardware or environmental factors at the previous location.

Figure 2:
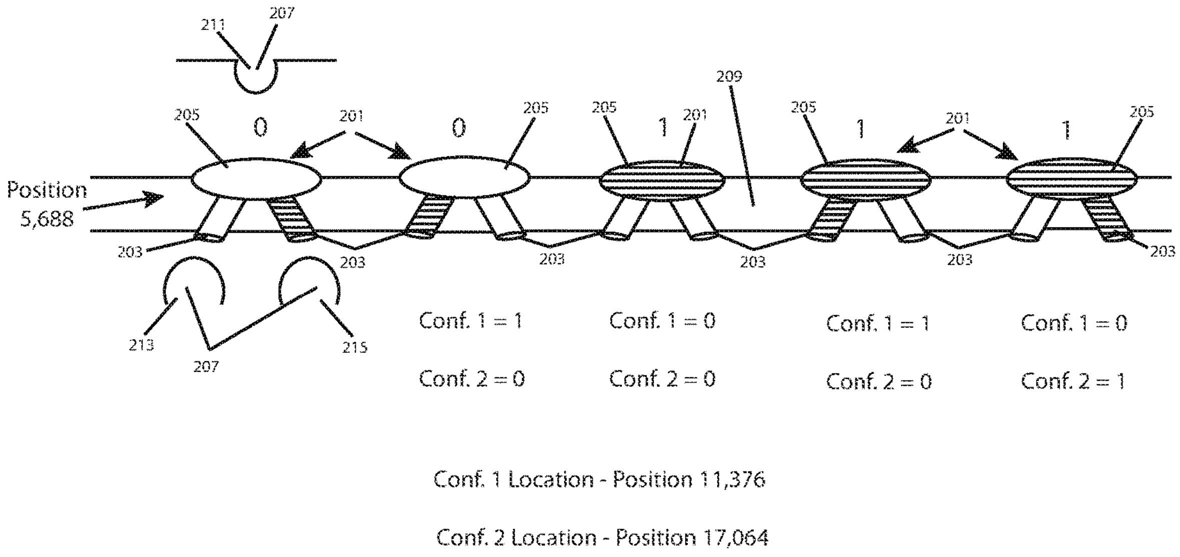
FIG. 2 is a side view of parts of data storage hardware elements with error-eliminating cross-checking sub-elements, in accordance with aspects of the present invention.

FIG. 2 is a side view of parts of data storage hardware elements 201 with error-eliminating cross-checking sub-elements 203, in accordance with aspects of the present invention. To reduce the need for remote units correcting local files as set forth above, a new form of data storage element 201 comprises smaller, deep storage sub elements 203. Elements 201 also comprise main storage areas 205. As shown in the figure, elements 201 may be scanned or written in any of five distinct ways by three read/write heads 207 that may pass above and below a substrate 209 in which elements 201 are embedded. First, the main storage areas 205 may be written in a way similar to conventional data bit writing in digital media. For example, a magnetizable domain within main storage area 205 may be magnetized as either a "1" or "0," as in digital compact disks or hard disks. To accomplish that writing event, head 211 may conduct a majority or all of the writing activity, and, owing to its proximity to area 205, selectively write only that area, and not areas 203 in the left-most element 201. Similarly, to read or write bits within sub-elements 203 of the left-most element 201, heads 213 and 215 may selectively read and write the left and right sub-elements, respectively.

In a preferred embodiment, the main storage areas 205 provide primary encoding for data files recorded in the media of which elements 201 are a part. Sub-elements 203, by contrast, provide remote double-redundant, distributed confirmatory cross-checking for other, preferably maximally distant elements 201, from both the element cross-checked and from each other. For example, if there are 17,064 elements 201 in a circular storage media, and the left-most element 201 in the figure is at serial position 5,688, its main storage area 205 may be confirmed by an error-checking control system, such as the exemplary control system provided below in reference to FIG. 15, by matching coding in the left-most sub-element of an element 201 in position 11,376 and the right-most sub-element of an element 201 in position 17,064, as one optimally-distributed arrangement for that element. Thus, if the encoded bit in main storage area 205 of the left-most element 201 of the figure disagrees with both of those cross-checking sub-elements, a control system may re-write that main storage area as in error. If only one of the sub-elements disagrees with the cross-checked main storage, however, the disagreeing sub-element may be re-written to match the main storage element and provide a more accurate cross-reference in the future. Any element or sub-element that repeatedly is found to be in error may be retired from use by the control system, or disregarded and, as mentioned above, areas of a media device determined to have errors, or repeated errors, may be avoided in the future for storing the correction to the error(s) and/or other data.

Figure 3:
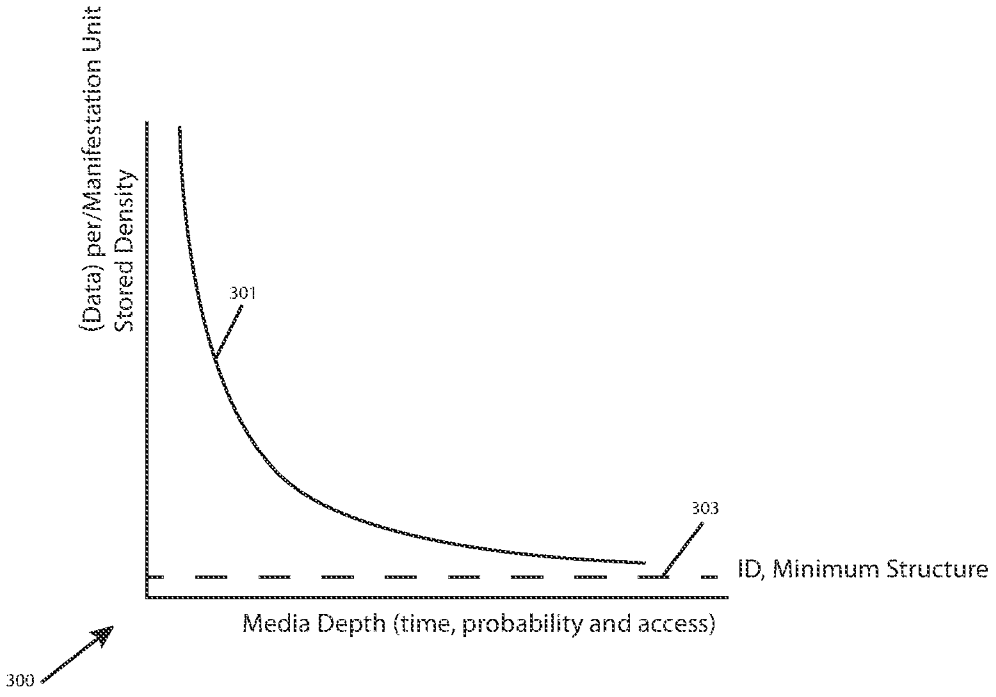
FIG. 3 is a graph depicting an exemplary density distribution of stored data corresponding with final output measures for a computer data file, as a function of the Media Depth, according to aspects of the present invention.

FIG. 3 is a graph 300 depicting an exemplary density distribution curve 301 of stored data corresponding with final output or Manifestation Units or other measures for a computer data file, as a function of the Media Depth (which may be defined, at least in part, by a probability and/or imminence of access), for example, for a specialized local file of the nature discussed with reference to FIG. 1, above. As mentioned in reference to FIG. 1, a Consumption Feed may be delivered to a user while various error-checking, updates and supplementation activities are carried out by a commonly-networked remote control unit. Because those error-checking, updates and supplementation activities take time to execute, they ideally will relate more greatly to media not immediately needed in the consumption feed delivered to the user. As a result, a high data density, and, preferably, complete data, is present for file aspects, such as Manifestation Units, so immediately needed by the local control system or Consumption Feed. Likewise, Manifestation Units or other file aspects not immediately needed, but with a low Media Depth, are present at a relatively high data density in curve 301. Error corrections, gap-filling, updates and other improvements may be delivered from a remote control system to the local control system or Consumption Feed to maintain curve 301, in real time as data storage in the local file and Consumption Feed be impacted by the progress of the Consumption Feed, to optimize the probability of providing a high-quality Consumption Feed and other factors (such as network connection speed and system resources). The curve presented as 301 thus demonstrates a greater data density per unit (on the Y axis) of content delivered in a consumption feed for aspects of the file or Manifestation Units fed to the user initially, and likely to be served sooner than others (the media depth measure plotted against the x axis). However, a minimum level of data density is shown as floor 303, which may be required as a minimum structure for organizing the file aspects and basing supplementation, for any locus of the file, depending upon the embodiment.

In addition, a remote control unit may also deliver data according to optimal speeds based on its own system resources, network speed, or local control system resources. For example, if network speed reduce and prior sent data fails to fulfill curve 301 for the local data file and Consumption Feed, a greater amount or rate of data may be sent, or lower resolution data may be sent, to the local control unit and/or Consumption Feed.

Figure 4:
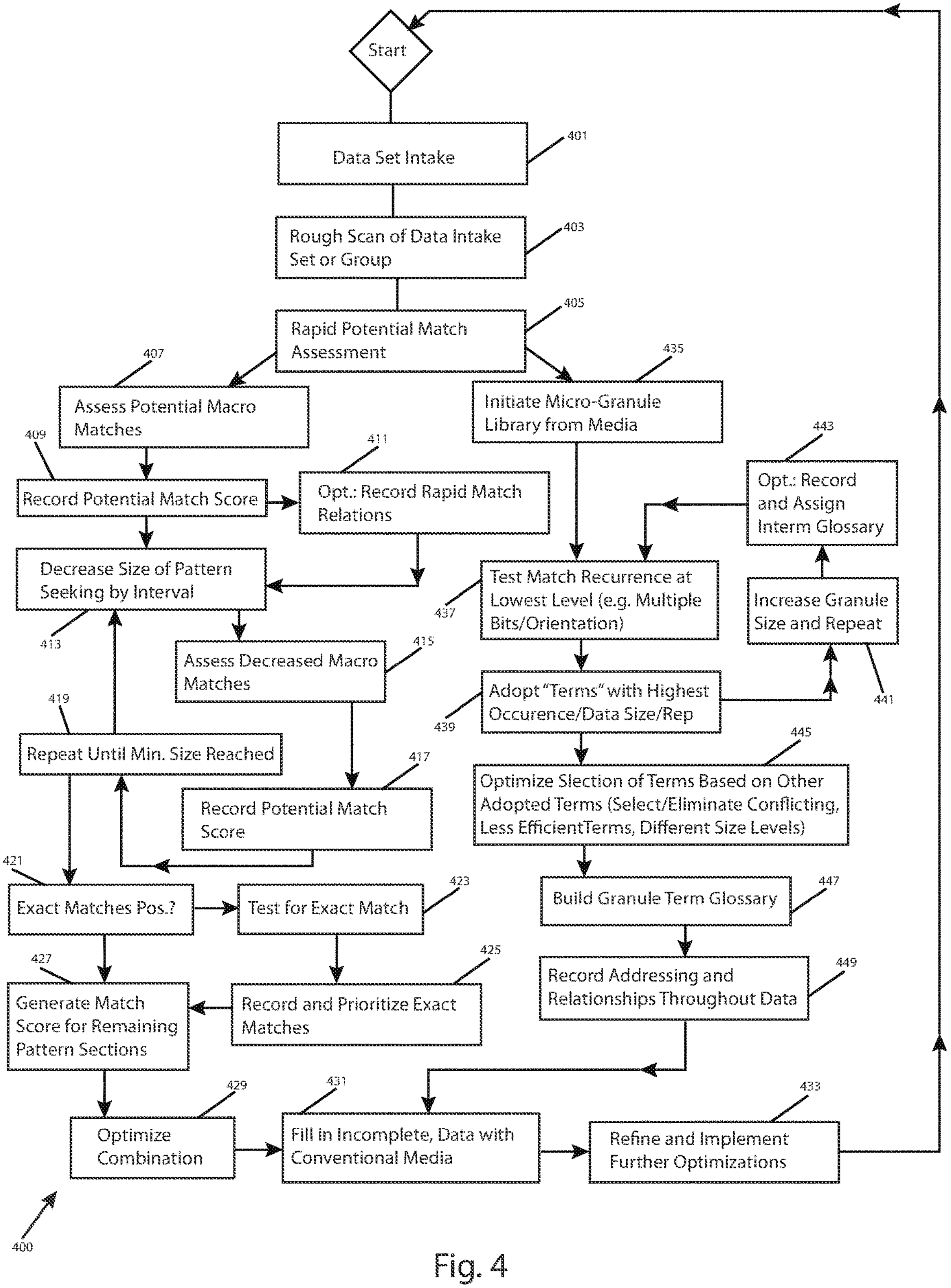
FIG. 4 is a process flow diagram depicting exemplary steps that may be carried out by a control system, or combination of control systems, implementing exemplary programming, methodology and other aspects of the present invention.

FIG. 4 is a process flow diagram depicting exemplary reference media data storage steps 400 that may be carried out by a control system, or combination of control systems, implementing exemplary programming, methodology and other aspects of the present invention. An exemplary control system, which may be used to implement the various steps 400, and other aspects of the invention, is provided in FIG. 15 and the related discussion set forth below, among other places. Beginning with step 401, the control system first takes in a set of data for storage (and other, future use) by the control system. Rather than simply store bits directly representing the data in media, as will become clear in the following discussion, the control system may construct pattern matching and other relationships between the data taken in and a reference media device or file. Such reference media devices or files may take on a wide variety of forms, several of which are discussed in additional figures, below. Turning back to the present figure, the control system next performs a rough scan of the data set or other group taken in for recording and future use, in step 403. At this point, the control system may proceed to simultaneously perform two parallel processes: (1) a large-scale pattern-matching process, treated on the left-hand side of the figure; and (2) a small-scale library-building process, on the right-hand side of the figure. These and other processes are set forth in detail below.

Beginning with the large-scale pattern-matching process, in step 407, the control system first assesses the largest possible scale pattern-matching or other relationships between the reference media device/file and the data set that has been taken in. These potential "macro" level matches and other relationships are preferably roughly but rapidly assessed initially, and may be of limited use by the control system in reducing needed conventional analog or digital media data storage. A potential further match and benefit, however, may also be tentatively assessed at this large-scale, in step 409. In one embodiment, in optional step 411, the rapidly-acquired, rough matches and other relationships, may be recorded by the control system, and implemented on an interim basis while further steps are carried out, as set forth below. In any event, in step 413, the control system then proceeds to decrease the level/scale of its pattern-matching activity to seek matches and other relationships between smaller patterns (by a scale adjustment factor or other interval that may be pre-set or selected by the control system) in the reference media device or file and the data taken in by the control system in step 401. In step 415, the control system then assesses the potential benefits and other results of the newly-defined matches and other relationships established at the smaller scale selected. The data storage space required, and other efficiencies, of defining and storing the data taken in by patterns at all scales assessed thus far may then be compared, and a potential score may be determined and recorded for applying a variety of different patterns discovered and applied by the control system, in step 417. The control system may then again decrease the size of the patterns reviewed and applied to the data taken in, in step 419, repeating steps 413-417 to smaller-scale patterns at further decreasing intervals. At a particular cycle of these steps 413-417, the control system may reach a minimum pattern size, below which the control system will not continue its pattern-matching and other relationship construction activities in steps 413-417. At that stage, a wide variety of possible matches, comparisons and other relationships will have been constructed, each requiring a different level of processing resources and conventional disk space to record the relationships (for example, by mathematical functions comparing the pattern and corresponding recorded data taken in). If exact pattern matches are found between the data taken in and the reference media device or file in steps 421 and 423, those matches may be given priority, or a rebuttably presumed priority, in step 425 for storage by reference. Scores for pattern-matching and other relationships (other than exact matches) may again be generated, in light of the data already recorded by exact matches, in step 427. Those scores may be further tested, and the most optimal combination of direct data storage and storage of data by defining relationships (between the reference media device or file and the data taken in) may be assessed and selected in step 429. The control system then records the data according to that assessed optimal combination, storing some data by direct, conventional methods, as may be optimal, in step 431. In step 433, further optimizations may be directed by the control system, depending on the results of the library building and small-scale pattern matching set forth on the right-hand side of the figure.

On the right-hand side of the figure, the simultaneous small-scale library-building and pattern matching process begins with step 435, in which the control system initiates the smallest scale pattern discovery from the reference media device or file. As will be explained in greater detail in other figures, below, some reference media devices or files may comprise an intentionally-created lexicon of a wide variety of simple shapes, textures, symbols and other small-scale features, while others comprise simply random features, which may be more difficult for the control system to discover and construct matches and other relationships to utilize. If structures similar to such small-scale patterns from the reference media device or file repeat frequently in the data taken in, such patterns may be selected as "terms" to form the small-scale library for relationship definition and data recording based on those relationships, in step 437 and 439. Terms and other patterns may be used by the control system to represent mathematical functions or approximations thereof, in addition to real-world pattern matches, each of which may be optimized and corrected with references and adjustments to each such pattern recorded in conventional media. Patterns generating more efficiency, by aiding in defining and recording more data, may also be preferentially defined as such "terms" in step 439. As in steps 413-419 on the left-hand side process, the control system may change the scale (this time, seeking patterns with increased size by a particular interval) and record interim results in several rounds of steps 441 and 443, until reaching a maximum size and proceeding to step 445. In step 445, the control system again may select and eliminate terms depending on an assessment of optimal combinations, accurately recording the data in terms of relationships with the reference media device or file, in light of other pattern matching and relationships, and conventional media, then available for such recording. Based on that optimization analysis, the control system may then build a more definitive library of small-scale terms to be used by the control system in recording and using the data taken in in terms of the reference media device or file, in step 447. The control system then so records the data in terms of the optimal pattern matching and other relationships in step 449, and proceeds to steps 431 et seq. After completing all steps, the control system may return to the starting position, and repeat all steps 400 for new data sets taken in by the control system. In addition, in some embodiments, the control system may re-write parts of the reference media device or files to build greater efficiency in pattern matching and other relationship building as discussed above. For example, if a term or large-scale pattern differs in a consistent way from data taken in in step 401, historically, the control system may modify the term or pattern to better match that historical experience.

Figure 5:
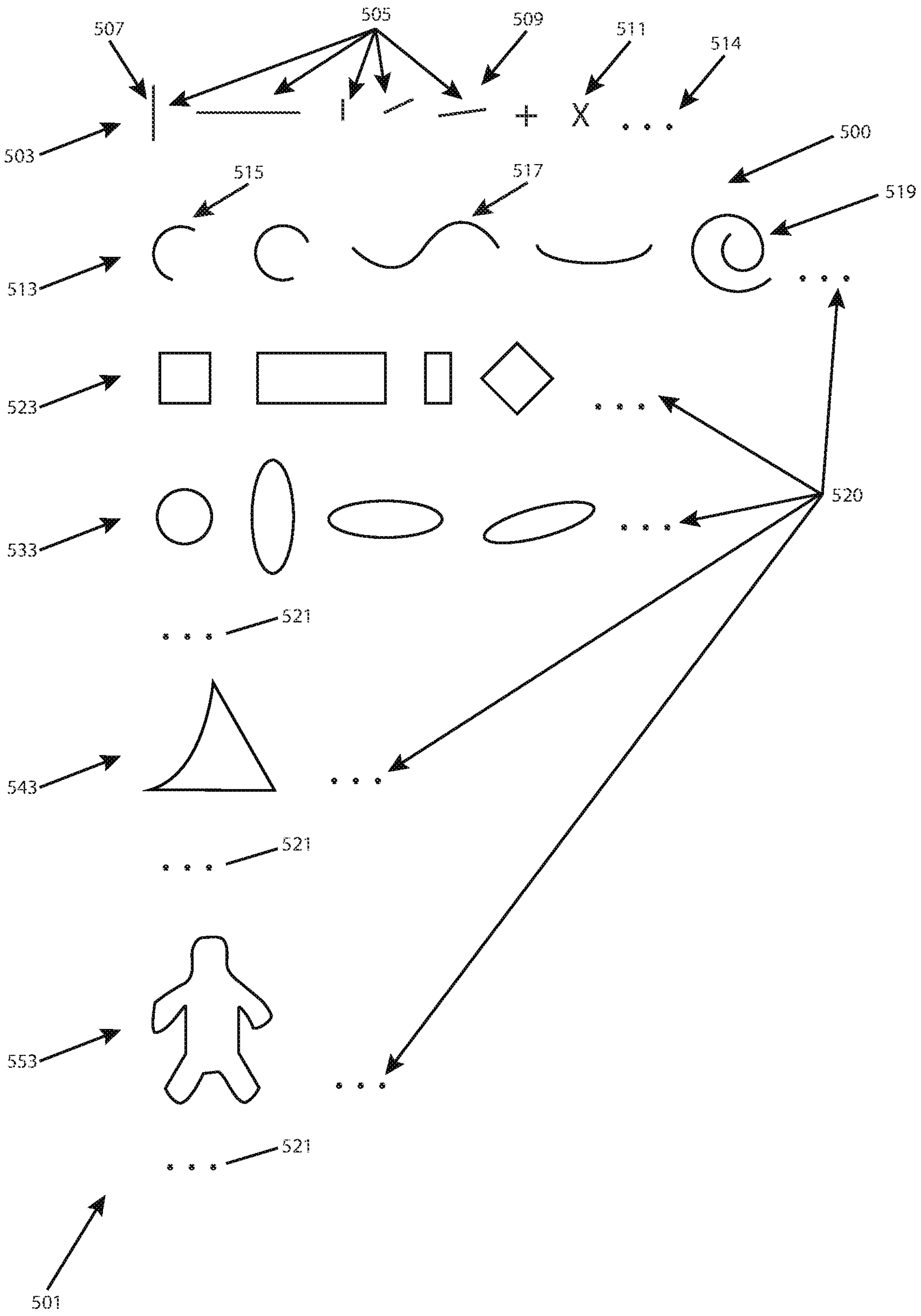
FIG. 5 depicts an exemplary series of increasingly large and complex patterns, as may be included in a reference media device or file used for facilitating data storage and access, in accordance with aspects of the present invention.

FIG. 5 depicts an exemplary series of increasingly large and complex patterns 501, as may be included in a reference media device 500 used for facilitating data storage and access, in accordance with aspects of the present invention. The exact patterns selected are exemplary, not exclusive, of the many different forms and types of such patterns. As mentioned elsewhere in this application, 3-dimensional, numerical, and other attributes and attribute patterns may be also be used to carry out aspects of the invention, although 2-dimensional patterns are depicted as examples in the present figure. A reference media device may be accessed by a control system locally, or remotely via a communications connection (such as a network) via specific addressing and protocols to locate and access the reference media device and, in some embodiments, features and aspects of the reference media device, examples of which are discussed herein. The series of patterns provided in FIG. 5 increase in complexity and complexity of type left-to-right and top-to-bottom, but, in other examples, the patterns may be otherwise organized and identifiable, or even randomly arranged or identifiable. For example, a top row 503 of pattern series 501 begins with a sub-series of 2-dimensional lines 505. The first of these, line 507, is arranged as a simple vertical line. Further right in the series, line 509 is a slightly more complex line for some systems to manage, because it is at an angle relative to the vertical and horizontal axis. Further still to the right, a slightly more complex arrangement of intersecting lines, also at an angle relative to the vertical and horizontal axis, is shown as 511. In a particular embodiment useful for general data storage, the series may continue on to the right, as demonstrated by series continuation ellipsis 514 but, for the sake of simplifying the example and enhancing explanation, a larger series of increasingly complex straight line arrangements is not explicitly shown.

Progressing downward through the series 501, a second row down 513 of patterns of an increased complexity type (namely, curved lines) is depicted. As with row 503, instances of such patterns iterate to the right in row 513 by increasing complexity. Curve 515, furthest to the left, is a partial, circular curve, and the simplest in the row. More complex curves, such as 517 and 519, appear to the right within row 503. As with row 503, and all other rows of patterns shown in FIG. 5 may continue further to the right, a shown by ellipses 520. In addition, additional rows, other than the rows explicitly shown, may be present, but are omitted from the figure to simplify the discussion. Exemplary areas where such rows may intercede in series 501 are demonstrated by ellipses 521. Continuing downward through the series, rows of increasingly complex types (such as complete rectilinear shapes in row 523, ovals in row 533, curve/rectilinear combination shapes in 543, and rough body outlines in row 553) are shown. Each of those rows, as with rows 503 and 513, may include pattern instances of increasing complexity, progressing from left-to-right through them.

As explained above, a control system may assess matches and build other relationships between a data set taken in and patterns of a reference media device 500. In some embodiments, where a control system stores data of a particular type suited to relationship building based on the particular patterns present in device 500 (for example, data including image files), the purposeful inclusion of 2-dimensional patterns of the types and varieties given in FIG. 5 may be particularly useful. Furthermore, the arrangement of patterns by increasing complexity may aid a control system in scanning and accessing patterns in the set, for example, by identifying the most useful direction for scanning to identify patterns with which to match or otherwise create relationships with particular data taken in by the control system. In other embodiments, however, a more explicit pattern identification and retrieval system (such as serial encoding or tagging) may be used, in addition or instead of exploring the series according to its arrangement of increasing complexity.

In some embodiments of the invention, the particular patterns, shapes or other attributes accessed from a reference media may be themselves written or modified or re-written by the control system, in order to optimize building relationships according to historical or projected experience with data saving, and according to present storage needs (and in light of new data intake). For example, if a given angled line pattern, such as 509, is found to deviate significantly from another, similar angled line present in stored data or data taken in, or an average such stored line or, and especially, a repeated similar angled line present in stored data or data taken in, then angled line 509 may be modified to reflect that line present in the stored data or data taken in. The greater direct relationships thus may aid the control system in more efficiently storing data according to such relationships.

Figure 6:
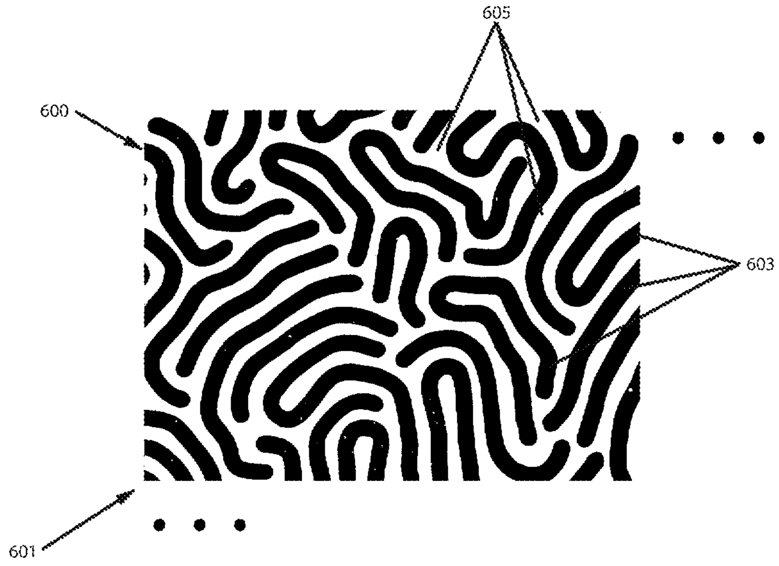
FIG. 6 depicts an exemplary random pattern of magnetic bubble memory domains, as may be present in a reference media device or file used for facilitating data storage and access, in accordance with aspects of the present invention.

FIG. 6 depicts an exemplary random pattern of magnetic bubble memory domains 601, as may be present in a reference media device 600 used for facilitating data storage and access, in accordance with aspects of the present invention. Unlike the patterns set forth in FIG. 5, above, the magnetic bubble domains of FIG. 6 are not manifested in discrete units or by ascending complexity in any particular direction. Instead, they occur in more continuous, overlapping, and interrelated features, including domain centers, such as the examples shown as 603, and lines of separation, such as the examples shown as 605, within device 600. While domains 601 do not necessarily increase in size, complexity or other wise change character in a particular direction across or through device 600, the random patterns that they exhibit nonetheless include uniquely identifiable and definable attributes. As a result, a control system, such as the control system set forth in reference to FIG. 15, below, can be used to carry out aspects of the present invention set forth for reference media, such as the steps set forth above in reference to FIG. 4. Briefly, the control system may scan, identify and define various attributes and features as large-scale (macro) patterns and small-scale library terms, construct defining relationships between them and data taken in by the system, and optimize those patterns and terms. As part of that process, the control system may generate an address, for example, in conventional data storage material, based on the pattern and/or locus of the defined patterns and terms, which may be included within those defined relationships.

Although the patterns of domains 601 are random or pseudo-random in nature, a control system may again overwrite or otherwise modify such patterns in light of experience with data taken in and stored with reference to them, to optimize the efficiency and utility of device 600 and the control system in storing new and previously stored data. For example, the domains may be written into a form such as that shown in FIG. 7, below, to optimize usage of media device 600. If the relationships built by the control system, such as matching patterns and terms with aspects of data taken in, is incomplete or inaccurate, the system may fill in gaps and define corrections to the relationships in conventional media. However, in some embodiments including the supplementation media aspects discussed above, this correcting definition in conventional media is not completely done and instead omitted, at least in part, to build a data density distribution according to Media Depth. In other words, for data stored by a local control system implementing the supplementation aspects of the present invention, the local control system may conduct such correcting definition in conventional media more completely for data that is more immediately needed, more probably needed, or otherwise exhibiting a low media depth.

The precise size, pattern types, material and other aspects of magnetic bubble domain media device 600 are exemplary only, and not exhaustive of the many different forms that may be used to implement aspects of the present invention. The magnetic bubble domain media device 600 is one form and example of the lowest level control-system ascertainable features of a device being used to identify patterns and build relationships in accordance with aspects of the present invention. The scale and resolution of magnetic domains is such that the scale of the figure may be on the order of 100 micrometers per inch, which should be the assumed scale of FIGS. 6 and 7, but any practical scale for magnetic bubble memory domains may, alternatively, be used in embodiments using them. Much larger scale features and patterns within media and stored files may also be used to implement aspects of the present invention, as set forth, for example, with reference to FIGS. 4, 8-10 and 12-14.

Figure 7:
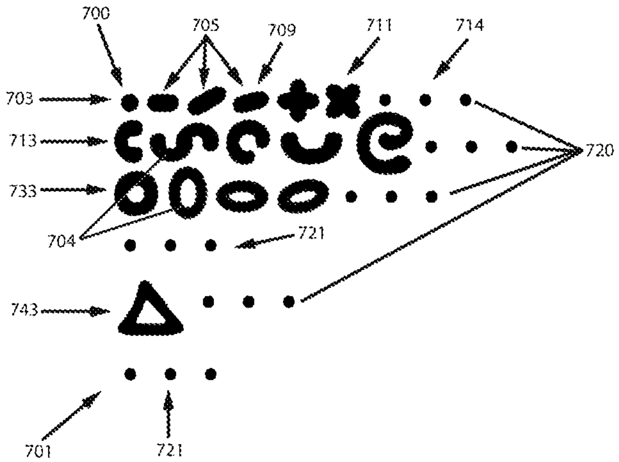
FIG. 7 depicts an exemplary series of increasingly large and complex patterns of magnetic bubble memory domains, as may be included in a reference media device or file used for facilitating data storage and access, in accordance with aspects of the present invention.

FIG. 7 depicts an exemplary series of increasingly large and complex patterns of magnetic bubble memory domains 701, as may be included in a reference media device 700 used for facilitating data storage and access, in accordance with aspects of the present invention. As such, the exemplary patterns are similar in nature to the patterns depicted in FIG. 5, above, but are formed in the more limited possible description by small-scale features of magnetic bubble domains and, therefore, somewhat simpler in form. As with FIG. 6, above, the magnetic bubble domain media device 700 is one form and example of the lowest level control-system ascertainable features of a device being used to identify patterns and build relationships in accordance with aspects of the present invention. Because the particular discrete patterns, such as those examples shown as 700, 705, 709, 711 704 and 743, may be scanned, interpreted, used to make matches and build other relationships with data taken in by the control system, they may be used in a similar matter to the similar patterns set forth with respect to FIG. 5. To ease understanding of the invention, the patterns of the same type and with similar aspects, and the rows and ellipses set forth in FIGS. 5 and 7 share the same latter two digits in their drawing element identification numbers.

FIG. 8 depicts another exemplary random pattern of a reference media or file used for facilitating data storage and access, in accordance with aspects of the present invention. In this instance, the random pattern 800 is shown as an output image 801 (for example, as may be output from a corresponding JPEG file encoding the image shown). The pattern depicted is generally a form of visual "white noise," similar in nature to what may be viewed in an instant when watching a television set tuned to a frequency with no programming. As a result, the television depicts the random pattern of television waves present at such a frequency (from cosmic background radiation). Nonetheless, the random file pattern depicted in FIG. 8 may be used productively as a reference media or file in accordance with aspects of the present invention set forth above. More specifically, unique patterns, shapes, pixel, and color relationships may be identified and defined, to build a library of data-matching (or otherwise relatable) terms, as set forth above with respect to FIG. 4. As discussed above, a control system, such as the exemplary control system set forth below, in FIG. 15, may define and optimize a granular feature library and create larger level pattern matches with respect to input and recorded data. As one example, if an image file of a person's foot is being input and recorded, a generally foot-shaped pattern 803 may be determined to be an optimal match for defining and recording the image input image file in relation to it. The control unit may then define differences from, scale and location of features of the input file in relation to the pattern 803.

FIG. 9 is a portion of view 9 described in FIG. 8, above, enlarged for magnification purposes, and showing a random small-scale pattern with no further structure than that depicted in FIG. 8. As with other random patterns in media discussed in this application, these smaller structure random patterns may be used by a control system to define terms and other matches and relationships for storing additional data and, although non-random small-scale patterns are not initially provided, a system may define and create such non-random small-scale patterns, in light of experience and projected experience with data being stored, while maintaining larger random patterns and using them for addressing or structure or matching, or similarly constructing new larger patterns.

FIG. 10 is a portion of view 10 described in FIG. 8, above, enlarged for magnification purposes, and showing a non-random small-scale pattern 1001 with an embedded structure of greater complexity than that viewable in FIG. 8. More specifically, a library of distinct shapes and symbols, such as those examples shown as 1003, is visible on that small scale in FIG. 10. For example, a sunburst shape 1005 may be seen. Thus, in accordance with the figure, an embodiment of a reference media or file used for facilitating data storage and access such as that depicted in FIG. 8 may include an embedded small-scale structure with purposefully-created, optimized or otherwise useful non-random attributes. Those attributes may then serve as a library, or library source, for comparisons and terms, as may be carried out by a control system implementing aspects of the present invention—for example, a set forth in reference to FIG. 4. In a preferred embodiment, such a small-scale structure and such attributes are selected to optimize usage of the reference media and file in a particular likely scenario (or scenarios) of use for the computer using the reference media. That likely scenario (or scenarios) can be modified by the control system based on experience, causing some library terms to be discarded, while still others are created, to optimize use in the context of particular data used by the control system. In some embodiments, the small (or large scale) library and comparison patterns may be taken, or created in reaction to, input data and input data types (and their frequency) to optimize the reference media or file.

FIG. 11 depicts an exemplary random sequence 1101 of binary digits, such as the examples shown as 1103, as may be present in a reference media or file used for facilitating data storage and access, in accordance with aspects of the present invention. As with the random patterns used in a reference media or file set forth in FIGS. 6 and 8, the random number sequence 1101, although randomly generated, may nonetheless be used by a control system implementing aspects of the present invention to build a library of data-matching (or otherwise relatable) terms, and larger-scale pattern matching, as set forth above with respect to FIG. 4, with reference to input data recorded by the control system. Also, the pattern of random digits may be altered or augmented to establish more optimal, storage space efficiencies, based on the control unit's historical experience with data sets, or based on expected experience with data sets, as also discussed above. Multiple reference media files may be used, with different media pattern types manifest in each, in some embodiments, and the system may use numerical or physical patterns advantageously for different purposes. For example, a numerical pattern signifying repeating relationships, fractal patterns, or golden ratios may, at times, more efficiently represent data than a physically written pattern. In such instances, the control system may select or embed such a numerical pattern within the numerical reference media file, while using a physically patterned reference media file to relate with other aspects of the data taken in by the control system.

FIG. 12 depicts a non-random image 1201 of a reference media or file used for facilitating data storage and access, in accordance with aspects of the present invention. As with the random patterns discussed with reference to FIGS. 6, 8 and 11, above, non-random unique patterns, shapes, pixel, and color relationships may be identified and defined, to build a library of data-matching (or otherwise relatable) terms, as set forth above with respect to FIG. 4. In fact, such patterns, shapes and other relationships may be easier for the control system to identify and use in facilitating data storage in accordance with aspects of the present invention, if taken from similar or otherwise related data to that being stored by the control system.

FIG. 13 is a portion of view 13 described in FIG. 12, above, enlarged for magnification purposes, and showing a random small-scale pattern with no further structure than that depicted in FIG. 12. As with other random patterns in media discussed in this application, these smaller structure random patterns may be used by a control system to define terms and other matches and relationships for storing additional data and, although non-random small-scale patterns are not initially provided, a system may define and create such non-random small-scale patterns, in light of experience and projected experience with data being stored, while maintaining larger random patterns and using them for addressing or structure or matching, or similarly constructing new larger patterns.

FIG. 14 is a portion of view 14 described in FIG. 12, above, enlarged for magnification purposes, and showing a non-random small-scale pattern 1001 with an embedded structure of greater complexity than that viewable in FIG. 12. As with the non-random small-scale pattern depicted in FIG. 10, a library of distinct shapes and symbols, such as those examples shown as 1403, is visible on that small scale in FIG. 14, and may be used and modified by a control system in defining optimal library terms and creating pattern matches, such as those discussed with reference to FIG. 4, above.

Figure 15:
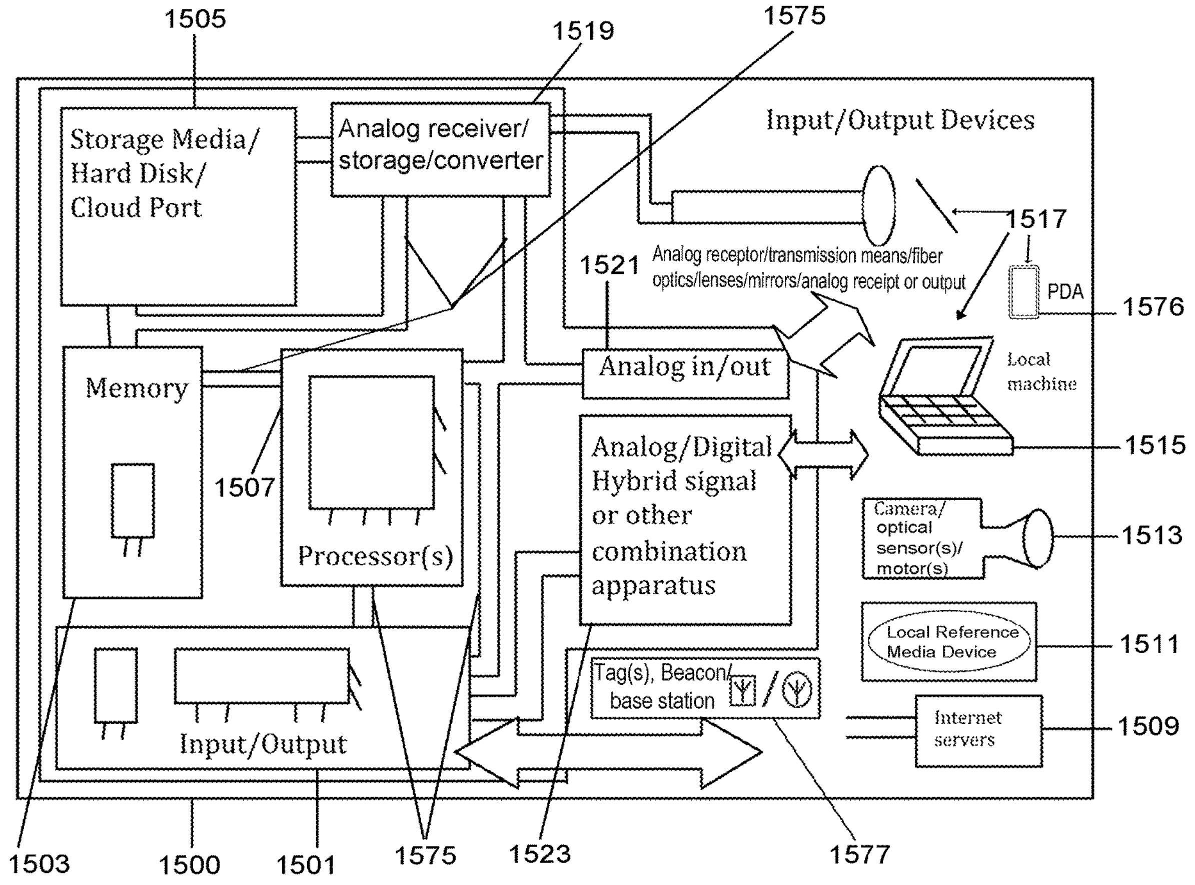
FIG. 15 is a schematic block diagram of some elements of an exemplary control system that may be used in accordance with aspects of the present invention.

FIG. 15 is a schematic block diagram of some elements of an exemplary control system 1500 that may be used in accordance with aspects of the present invention, such as, but not limited to implementing data storage and supplementation. The generic and other components and aspects described herein are not exhaustive of the many different systems and variations, including a number of possible hardware aspects and machine-readable media that might be used, in accordance with the present invention. Rather, the system 1500 is described to make clear how aspects may be implemented. Among other components, the system 1500 includes an input/output device 1501, a memory device 1503, storage media and/or hard disk recorder and/or cloud storage port or connection device 1505, and a processor or processors 1507. The processor(s) 1507 is (are) capable of receiving, interpreting, processing and manipulating signals and executing instructions for further processing and for output, pre-output or storage in and outside of the system. The processor(s) 1507 may be general or multipurpose, single- or multi-threaded, and may have a single core or several processor cores, including, but not limited to, microprocessors. Among other things, the processor(s) 1507 is/are capable of processing signals and instructions for the input/output device 1501, analog receiver/storage/converter device 1519, analog in/out device 1521, and/or analog/digital or other combination apparatus 1523 to cause a display, light-affecting apparatus and/or other user interface with active physical controls, such as indicator buttons and displays, and control actuation monitoring hardware, any of which may be comprised or partially comprised in a GUI, to be provided for use by a user on hardware, such as a specialized personal computer, media console, monitor or PDA (Personal Digital Assistant) or control unit screen (including, but not limited to, monitors or touch- and gesture-actuable displays) or a terminal monitor with a mouse and keyboard or other input hardware and presentation and input software (as in a software application GUI), and/or other physical controls, such as a button, knob or LEDs for determining appliance conditions or statuses or related circuit or other characteristics. Alternatively, or in addition, the system, using processors 1507 and input/output devices 1519, 1521 and/or 1523, may accept and exert passive and other physical (e.g., tactile) user, power supply, appliance operation, user activity, circuit and environmental input (e.g., from sensors) and output.

For example, and in connection with aspects of the invention discussed in reference to the remaining figures, the system may carry out any aspects of the present invention as necessary with associated hardware and/or using specialized software, including, but not limited to, controlling a supplementation-based data storage device with a reference media or file, controlling the provision of a Content Feed, and addressing errors and updates with a control unit and/or network. The system may also, among many other things described for control systems in this application, respond to user, sensor and other input (for example, by a user-actuated GUI controlled by computer hardware and software or by another physical control) to issue alerts, alter settings, control data storage, correction, augmentation and supplementation, or perform any other aspect of the invention requiring or benefiting from use of a control system. The system 1501 may communicate with another control system, similar in nature to system 1501, and control and be controlled by such a control system, and may permit the user and/or system-variation of settings, including but not limited to the affects of user activity and usage history on modes of operation of the system, and send external alerts and other communications (for example, to users or other administrators) via external communication devices, for any control system and control unit aspect that may require or benefit from such external or system-extending communications.

The processor(s) 1507 is/are capable of processing instructions stored in memory devices 1503 and/or 1505 (and/or ROM or RAM), and may communicate with any of these, and/or any other connected component, via system buses 1575. Input/output device 1501 is capable of input/output operations for the system, and may include/communicate with any number of input and/or output hardware, such as a computer mouse, keyboard, entry pad, actuable display, networked or connected second computer or processing device, control unit, other GUI aspects, camera(s) or scanner(s), sensor(s), sensor/motor(s), actuable electronic components (with actuation instruction receiving and following hardware), RF antennas, other radiation or electrical characteristics reading, monitoring, storage and transmission affecting hardware, as discussed in this application, range-finders, GPS systems, receiver(s), transmitter(s), transceiver(s), transflecting transceivers ("transflecters" or "transponders"), antennas, electromagnetic actuator(s), mixing board, reel-to-reel tape recorder, external hard disk recorder (solid state or rotary), additional hardware controls (such as, but not limited to, buttons and switches, and actuators, current or potential applying contacts and other transfer elements, light sources, speakers, additional video and/or sound editing system or gear, filters, computer display screen or touch screen. It is to be understood that the input and output of the system may be in any useable form, including, but not limited to, signals, data, commands/instructions and output for presentation and manipulation by a user in a GUI. Such a GUI hardware unit and other input/output devices could, among other things, implement a user interface created by machine-readable means, such as software, permitting the user to carry out any of the user settings, commands and input/output discussed above, and elsewhere in this application.

1501, 1503, 1505, 1507, 1519, 1521 and 1523 are connected and able to communicate communications, transmissions and instructions via system busses 1575. Storage media and/or hard disk recorder and/or cloud storage port or connection device 1505 is capable of providing mass storage for the system, and may be a computer-readable medium, may be a connected mass storage device (e.g., flash drive or other drive connected to a U.S.B. port or Wi-Fi) may use back-end (with or without middle-ware) or cloud storage over a network (e.g., the internet) as either a memory backup for an internal mass storage device or as a primary memory storage means, and/or may be an internal mass storage device, such as a computer hard drive or optical drive.

Generally speaking, the system may be implemented as a client/server arrangement, where features of the invention are performed on a remote server, networked to the client and facilitated by software on both the client computer and server computer. Input and output devices may deliver their input and receive output by any known means of communicating and/or transmitting communications, signals, commands and/or data input/output, including, but not limited to, input through the devices illustrated in examples shown as 1517, such as 1509, 1511, 1513, 1515, 1576 and 1577 and any other devices, hardware or other input/output generating and receiving aspects—e.g., a PDA networked to control a control unit 677 with the aid of specialized software (a.k.a. a "PDA Application" or "App."). Any phenomenon that may be sensed may be managed, manipulated and distributed and may be taken or converted as input or output through any sensor or carrier known in the art. In addition, directly carried elements (for example a light stream taken by fiber optics from a view of a scene) may be directly managed, manipulated and distributed in whole or in part to enhance output, and radiation or whole ambient light or other radio frequency ("RF") information for an environmental region may be taken by a photovoltaic apparatus for battery cell recharging, or sensor(s) dedicated to angles of detection, or an omnidirectional sensor or series of sensors which record direction as well as the presence of electromagnetic or other radiation. While this example is illustrative, it is understood that any form of electromagnetism, compression wave or other sensory phenomenon may become such an "ambient power" source harnessed to power the operations of a control unit and/or control system and/or may include such sensory directional and 3D locational or other operations-identifying information, which may also be made possible by multiple locations of sensing, preferably, in a similar, if not identical, time frame. The system may condition, select all or part of, alter and/or generate composites from all or part of such direct or analog image or other sensory transmissions, including physical samples (such as DNA, fingerprints, iris, and other biometric samples or scans) and may combine them with other forms of data, such as image files, dossiers, appliance-identifying files, or operations-relevant recordings, or metadata, if such direct or data encoded sources are used.

While the illustrated system example 1500 is helpful to understand the implementation of aspects of the invention, it should be understood that any form of computer system may be used to implement many control system and other aspects of the invention—for example, a simpler computer system containing just a processor (datapath and control) for executing instructions from a memory or transmission source. The aspects or features set forth may be implemented with, as alternatives, and/or in any combination, digital electronic circuitry, hardware, software, firmware, or in analog or direct (such as electromagnetic wave-based, physical wave-based or analog electronic, magnetic or direct transmission, without translation and the attendant degradation, of the medium) systems or circuitry or associational storage and transmission, any of which may be aided with enhancing media from external hardware and software, optionally, by wired or wireless networked connection, such as by LAN, WAN or the many connections forming the internet or local networks. The system can be embodied, in part, in a tangibly-stored computer program, as by a machine-readable medium and propagated signal, for execution by a programmable processor. The method steps of the embodiments of the present invention also may be performed by such a programmable processor, executing a program of instructions, operating on input and output, and generating output. A computer program includes instructions for a computer to carry out a particular activity to bring about a particular result, and may be written in any programming language, including compiled and uncompiled, interpreted languages, assembly languages and machine language, and can be deployed in any form, including a complete program, module, component, subroutine, or other suitable routine for a computer program.

Figure 16:
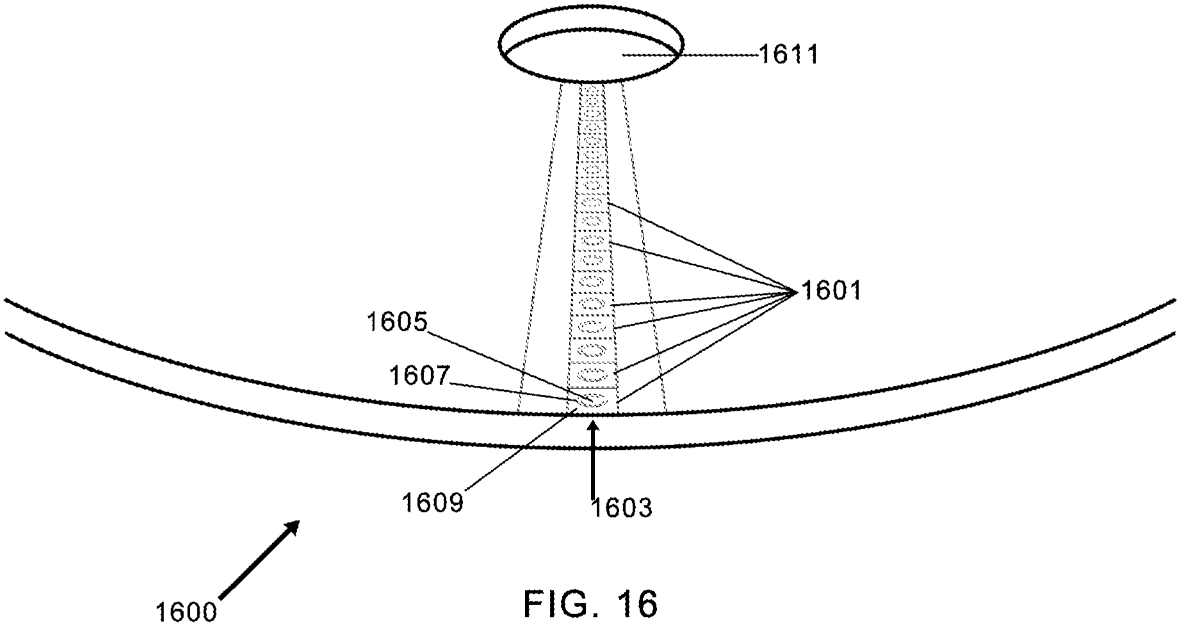
FIG. 16 is a perspective drawing, depicting aspects of an exemplary data storage medium, in accordance with aspects of the present invention.

FIG. 16 is a perspective drawing, depicting aspects of an exemplary data storage medium 1600, in accordance with aspects of the present invention. The present figure provides context and a general overview of such a data storage medium, while smaller details are treated in greater depth below, in reference to FIGS. 17 and 18.

Data storage medium 1600 comprises a series of similar data storage subunits ("data storage unit(s)"), such as the examples pictured as 1601, an exemplary readable row of which is shown as data storage unit row 1603. The data storage subunits 1601 may each include a writable domain subunit, such as the example shown as 1605, which may be of any suitable type known in the art, such as magnetic or optical data storage domains, with or without defined borders. But preferably, writable domain subunits 1605 are bordered and protected by defined borders (or a hole), such as the example shown as 1607, to protect data integrity and provide at least some segregated surrounding space for a data conditioning structure 1609, structured around subunits 1605, which serves to elaborate and increase the complexity of the data written in domain subunits 1605, as set forth in greater detail below.

As with traditional magnetic or optical storage domains, domain subunits 1605 may be cued up and addressed by a head or other subdevice for reading and writing data on a plurality of data storage domains. For example, medium 1600 may adjoin or comprise a motorized spindle 1611, connected to a control system, causing the data storage units 1601 (and their inherent writeable domain subunits 1605) to be addressed and read or written by a writing head or other data writing subdevice (not pictured).

Figure 17:
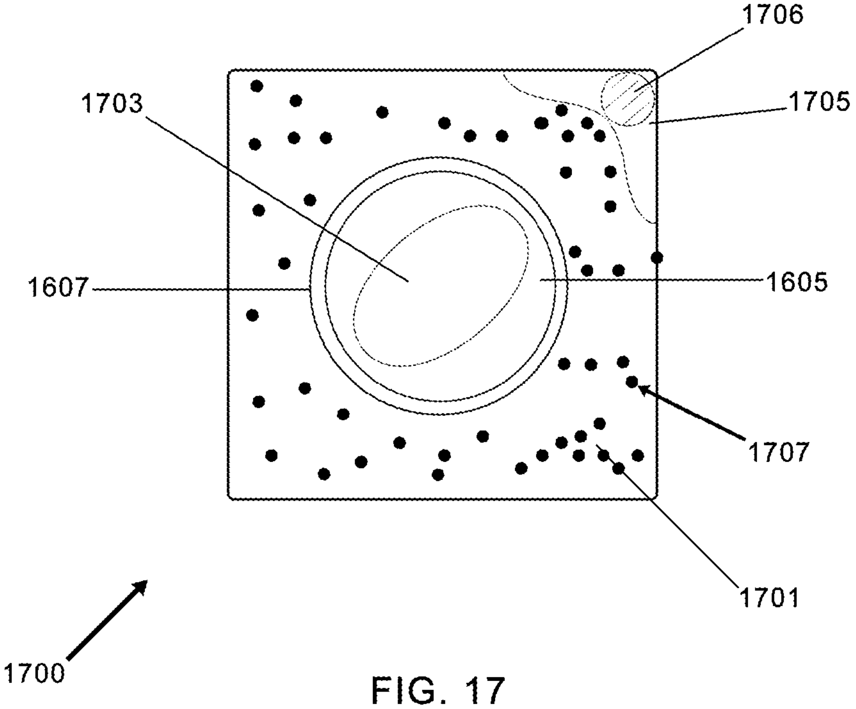
FIG. 17 is a top view of an exemplary storage unit, and a surrounding conditioning structure, of the exemplary data storage medium set forth in FIG. 16, above.

FIG. 17 is a top view of an exemplary data storage unit 1700, and a surrounding conditioning structure 1701, of the exemplary data storage medium set forth in FIG. 16, above. Data storage unit 1700 may be any of the exemplary data storage units 1601 discussed above, or any other similar data storage unit within data storage medium 1600, as discussed in reference to FIG. 16, above. From the enlarged, overhead view of the exemplary data storage unit 1700, several of the subfeatures of such data storage units discussed above can be seen more clearly. Additional features of data storage units (or, depending on the embodiment, of a reading or writing head or other data reading or writing subdevice) can also be seen.

For example, the writable domain subunit 1605 can be seen, centered within the data storage unit. As mentioned above, a writing head or other data writing subdevice may write data into domain subunit 1605, for example, by selectively magnetizing or inscribing the domain subunit 1605 with a magnetized or otherwise (e.g., optically) defined shape, such as the example pictured as 1703. As pictured, written domain shape 1703 is a slightly elongated bubble shape, extending from the lower left-hand direction, to the upper right-hand direction of the figure. However, it should be understood that other shapes, oriented in any number of possible directions, may also, alternatively, be written into domain 1605. Each such possible alternative shape, which may be selected and written by a specialized writing head or other data writing subdevice (e.g., with a rotatable and laterally moveable armature connected to a data writing subsection with effective area and accuracy of better than 1% of the area of the domain), may be variously selected and written into domain 1605 by the control system. And each such selectable shape may have a particular effect on the surrounding conditioning structure 1701, such that, when conditioning structure 1701 is read by a reading subcomponent of the control system (e.g., a magnetic reading head or an optical sensor) a unique new data set results. As discussed below, in some embodiments, the reading subcomponent may itself include the conditioning structure, and place it around domain 1605 during a reading operation only. In this way, the same (or a more limited set of) conditioning structures may be used by the system to read many different domains, yielding a wide array of more complex, resulting data. As also discussed in greater detail below, the conditioning structure 1701 preferable comprises a patterned conditioning medium that, when used to read a domain, creates a more complex set of data (e.g., 4 bits of data, from a domain that, by itself, is inscribed with one bit or a digitally infinite piece of data—such as positive or negative for a magnetic digital feature, albeit with an infinitely varied direction as pictured for shape 1703). However, the system, and the writing head or other data writing subdevice need not implement the selected shape with knowledge or even an estimate of what more complex data set will result. For example, if an optical domain is written by an optical writing head or other data writing subdevice, the surrounding media 1701 may be optically translucent, with a pattern of divisions or slots that, in conjunction with single the band or slot created by the writing head or other data writing subdevice, yield a number of unique light rays or a interference bands at a reading area 1705, when read by a reading head or other reading device. In the example provided, reading area 1705 comprises a window 1706, through which a reading head or other device placed above it can sense a particular charge or visual pattern. With no knowledge of what data set may emerge from such a particular written shape, the control system can test various different options at random or in a progression by reading the output until it matches a desired reading to be stored, and/or associating or relating the output with a desired output (e.g., in an externally-stored library). The pattern of divisions or slots, represented by the pattern of subfeatures shown as 1707, may be random, pseudo-random, or progressively patterned, varying at different points within conditioning structure 1701. In the example of magnetic domains, such a pattern may be with charge concentrations that interact with the written domain to yield unique charge characteristics at multiple points read within area 1705. The examples of magnetic and optical media are exemplary only, and it will be readily apparent that aspects of the present invention may be applied to any of a wide variety of possible data storage media domains that, when combined with patterns in such a conditioning structure, conditioning a reading event in the particular media, yields a more complex data set.

Figure 18:
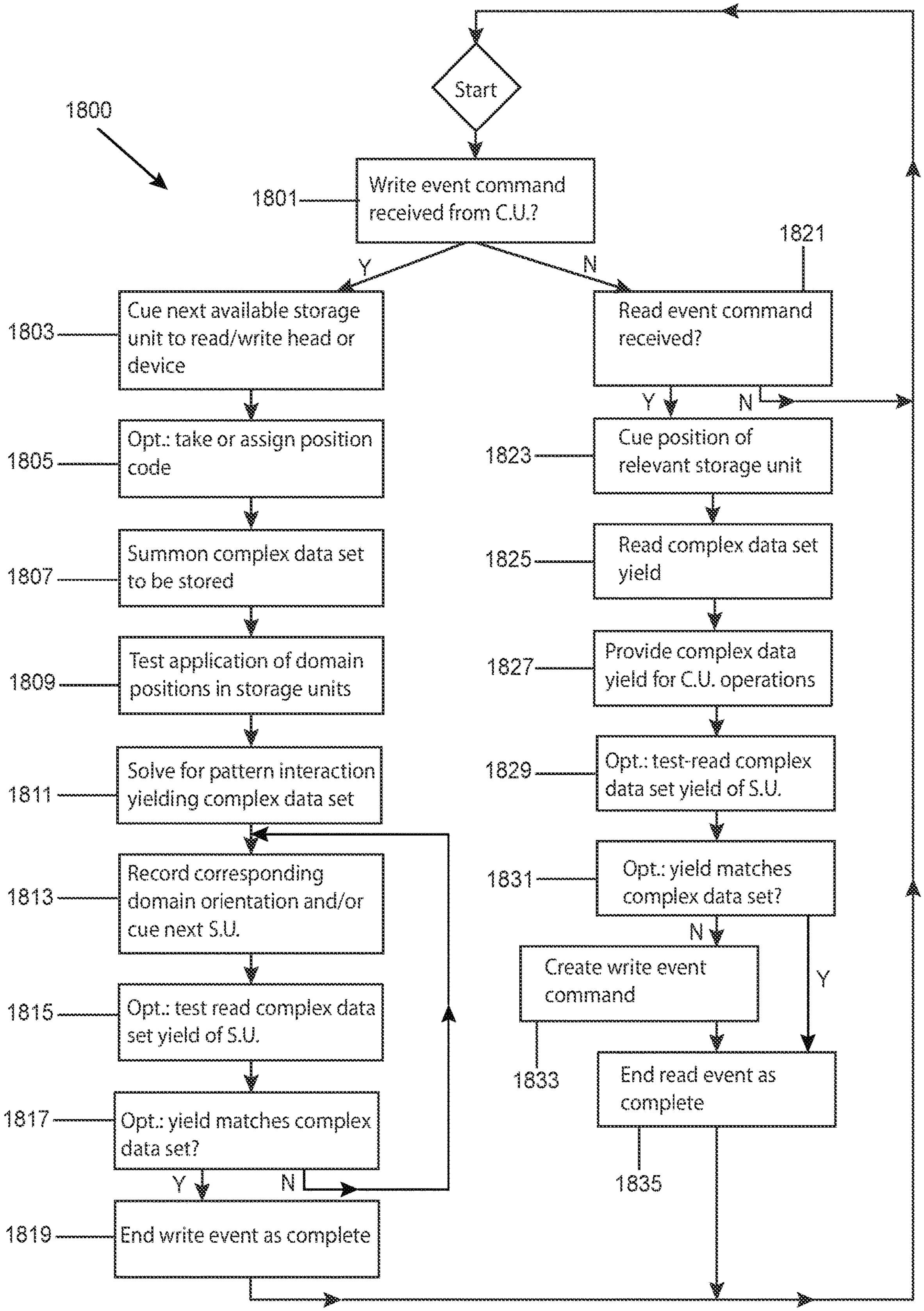
FIG. 18 is a process flow diagram depicting exemplary steps that may be carried out by a control system, or combination of control systems, implementing exemplary data elaboration programming, methodology and other aspects of the present invention.

FIG. 18 is a process flow diagram depicting exemplary steps 1800 that may be carried out by a control system, or combination of control systems, implementing exemplary data elaboration programming, methodology and other aspects of the present invention. Beginning with step 1801, a control system, such as the control system set forth in reference to FIG. 15, above, may issue a command to a data writing head or other data writing subdevice (such as any of the possible magnetic or optical writing subdevices discussed with reference to FIGS. 16 and 17, above) to write data to a data storage medium. If so, the control unit (or "C.U.") then proceeds to step 1803, in which it commands the writing head or other data writing subdevice to cue up and address an available (unwritten or authorized to be overwritten by the C.U. or a user) storage unit of the storage medium. Such a storage unit may be any of the exemplary magnetic or optical data storage units discussed above, in reference to FIGS. 16 and 17. In optional step 1805, the control unit and/or writing head or other data writing subdevice may make or record a code identifying the position of the storage unit. The control unit may then proceed to step 1807, in which it summons or cues a specific complex data (more complex than the data or datum inscribed by a domain, as set forth above) set to be stored by the storage unit and control system, in accordance with aspects of the present invention. Proceeding to step 1809, the control system may inscribe and test, in series, any number of possible shapes onto the domain, according to aspects of the invention set forth above, reading the more complex output data sets seriatim, until the specific complex data set to be stored is yielded by a reading device (e.g., reading the storage unit at the viewing area, as discussed above), in step 1811. The control system may then record the domain shape (or domain shape writing event) yielding the desired data or simply proceed to the next storage unit to be written, in step 1813. Also optionally, the control system may test the written storage unit by reading it again, in step 1815, to ensure that it has been written properly and securely. If a set of data other than that sought to be written is read in this testing step, in step 1817, the control system may return to step 1813. Otherwise, the control system/unit may proceed to step 1819, in which it ends the writing event at that storage unit.

The control system may also read the more complex data output by a storage unit, as discussed in steps 1821 et seq. Starting with step 1821, the control system may determine whether a data reading command has been received, to read data stored in a storage unit. If so, the control system proceeds to step 1823, in which it may cue the position of the relevant storage unit to be read (as potentially stored at step 1805). Proceeding to step 1825, the control unit may use any of the data reading heads or other data reading subdevices discussed above to read the more complex output of the storage unit. The control system may then provide that complex data set for any system operations for which it was needed (e.g., in other, short term memory, such as RAM) in step 1827. As with steps 1815 and 1817, the control unit optionally may test the data stored in the storage unit again, in case the reading event corrupted the data stored within it, in steps 1829 and 1831. The control unit may then correct the data, if so corrupted, in step 1833 through similar writing steps set forth as 1807 et seq., and/or end the reading event in step 1835, returning to the starting point of process 1800.

Figure 19:
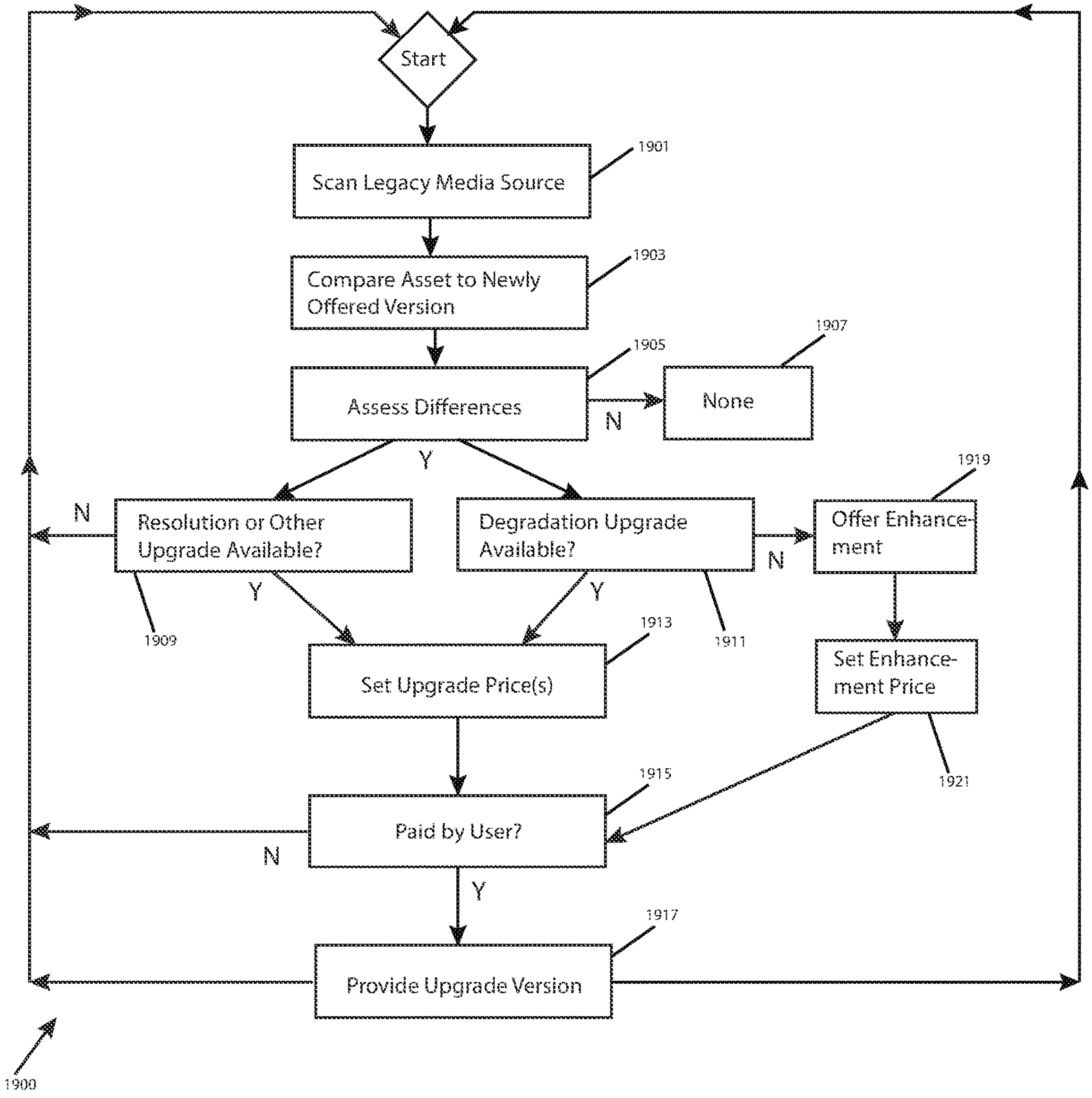
FIG. 19 is a process flow diagram depicting exemplary steps that may be carried out by a control system, or combination of control systems, implementing exemplary programming, methodology and other aspects of the present invention related to providing an upgraded experience of legacy content to a user.

FIG. 19 is a process flow diagram depicting exemplary steps 1900 that may be carried out by a control system, or combination of control systems, implementing exemplary programming, methodology and other aspects of the present invention related to providing an upgraded experience of legacy content to a user. Beginning with step 1901, a control system, such as the control system set forth in reference to FIG. 15, above, first scans content recorded on a local data storage device of a user (e.g., on a magnetic, optical or other data storage medium (or media). In some embodiments, the user may be a consumer of entertainment content, such as a motion picture, video game or music. In such embodiments, the user may have a "legacy" form of that content, such as an earlier version of that content, offered some time earlier than steps 1900 being carried out. In some such cases, the legacy form of the content may be at a lower resolution, and/or an at least partially inaccessible and/or degraded form, when compared to a newly-offered version of the content (e.g., by the copyright holder or licensor). In some embodiments, the control system offers to upgrade, prices an upgrade, and upgrades the content, by providing the content at a more current, higher standard, or otherwise enhanced version of the content, based on that form of the content.

For example, in step 1903, the control system compares the legacy form of the content recorded on a local data storage device of a user with the newly-offered version of the content. For example, the control system may assess a level of degradation of data representing the legacy form of the content (e.g., due to unstable, degrading media). For example, the control system may assess a level of random alterations to the data, negatively affecting the quality of images stored on the local data storage device of a user (e.g., causing a "mosquito pattern" in the images, when displayed) based on the number of differences between a more accurately-maintained record of the content, on a remote storage device (e.g., an internet server maintained and accessed by the control system over the Internet). As another example, in some embodiments, the control system assesses quality differences between the historic version, and the newly offered version, of the content. For example, in some embodiments, the control system may assess an age of the historic version of the content held on the local data storage device of the user (e.g., by matching the content scanned to such a version, and/or by scanning metadata of the historic version), and assess quality differences based thereon. The control system may assess any such differences between the historic version of the content held on the local data storage device of the user and the newly offered version, in step 1905. As will be explained below, if no such differences are found and/or available through the control system, the control system may proceed to step 1907 et seq. in some embodiments, as will be discussed in greater detail below. If such differences are found, however, the control system may proceed to determine how the historic version of the content held on the local data storage device of the user may be upgraded based on the newly offered version (e.g., to more closely match or even exceed its resolution or other qualities) in example steps 1909 and 1911, which will also be discussed in greater detail below.

In some embodiments, the control system may determine that the resolution or other legacy aspects of the content delivered to the user as an experience (e.g., via a monitor and audio speakers, or other display devices and actuators) can be improved by upgrading them (e.g., boosting the resolution of the content), in step 1909. In some embodiments, the control system may determine that such a resolution increase can be achieved by inserting additional data into data recorded on a storage device of the user. In some embodiments, can be achieved by filtering, altering or applying an algorithm or additional factor to data recorded on a local data storage device of the user. For example, in some embodiments, a pattern held on structure auxiliary to a read/write device of a control system comprising the user's local data storage device may be applied to a data set stored on the local data storage device. In some embodiments, the control system may determine that the most efficient way to improve the resolution of the content delivered to the user as an experience is to completely replace all or part of the data stored on the local data storage device. In some such embodiments, the control system determines that the user experience may be upgraded by so replacing those data with data from the new version at a display or other actuator managed by the control system (e.g., streaming it to the user for experiencing it). In some such embodiments, the local copy of such data from the new version may deleted after viewing (e.g., in the event of a rental of the new content by the user.)

In some embodiments, the control system may determine that the alterations due to media degradation, discussed above, can be repaired by filling in higher resolution and/or correcting data, sourced from the newly-offered version of the content, in step 1911. In some embodiments, however, the control system may determine that the most efficient way to repair the content delivered to the user as an experience is to completely replace all or part of the data stored on the local data storage device. As above, in some such embodiments, the control system determines that the user experience may be improved by so replacing those data with data from the new version at a display or other actuator managed by the control system (e.g., streaming it to the user for experiencing it). In some such embodiments, the local copy of such data from the new version may deleted after viewing (e.g., in the event of a rental of the new content by the user.)

If the control system determines that no such upgrades or repairs to the historic and/or legacy content can be accomplished, the control system may return to the starting position.

If, however, such upgrades or repairs are determined to be possible, the control system may proceed to discover or otherwise determine a price for providing such an upgrade or repair to the user, and improving the user's experience of the content, in step 1913. The control system may then provide one or more prices, for providing one or more improvements to the user's experience (e.g., in a graphical user interface through which the user may select, and pay for such improvements. The user may then elect to pay for, and obtain access to, an improved experience of an upgraded or repaired content, which the user may elect to pay for (e.g., through selection with tools provided through the user interface), in step 1915. If the price is paid, the control system may proceed to step 1917, in which it delivers the improved experience of the content to the user.

In some embodiments, additional improvements, other than fixing alterations due to media degradations or upgrading the legacy content, may be similarly assessed, and offered to the user for a price, in steps 1919 and 1921. For example, in some embodiments, a user may select new content, which may be added to the legacy content (e.g., a wider view, or 3-D version, or video game version with greater interactivity, of a movie) may be provided as an optional delivery to the user. The user may then similarly pay for and enjoy improved experienced based thereon, in steps 1915 and 1917.

The control system may then return to the starting position.

Figure 20:
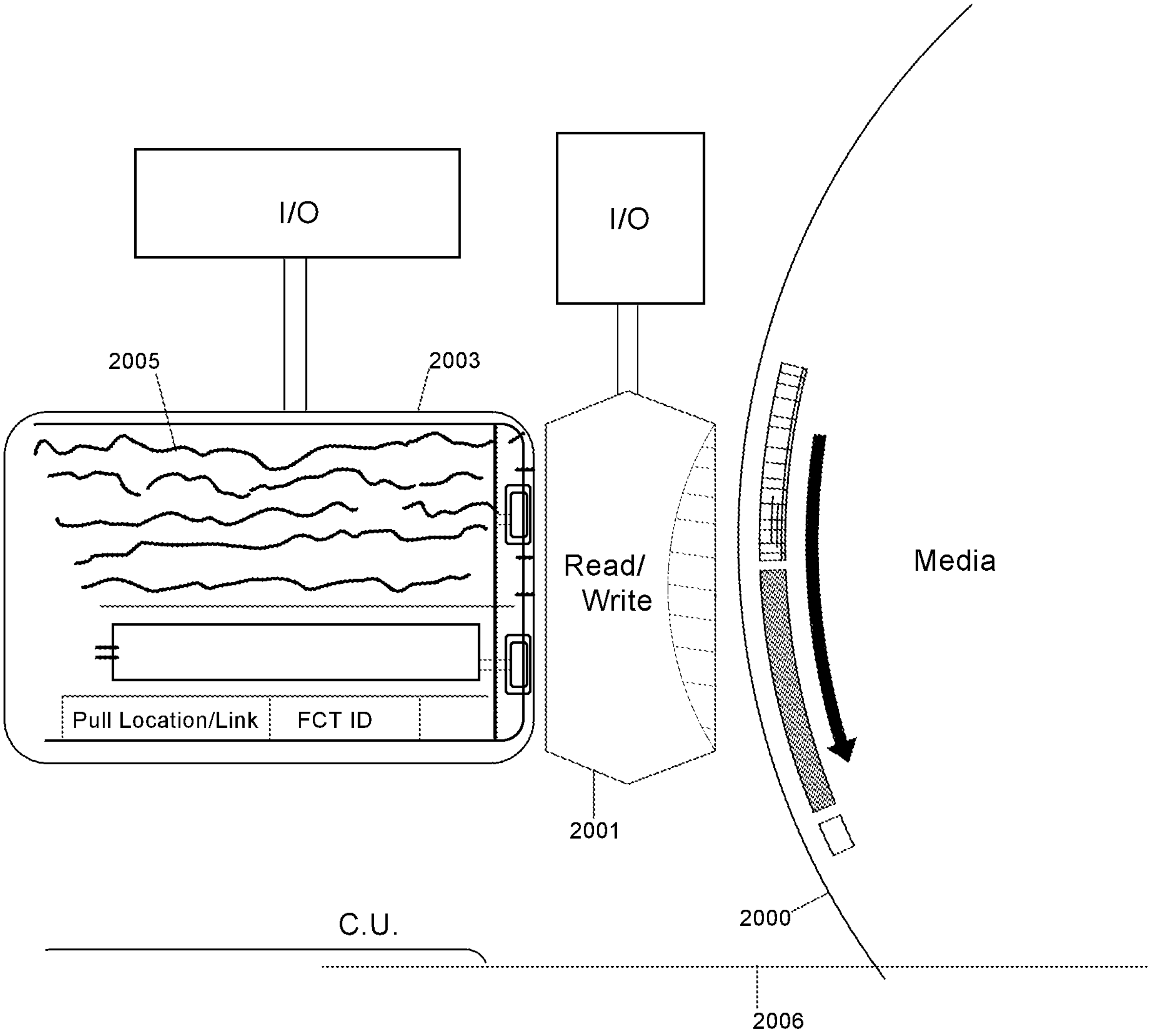
FIG. 20 is a drawing of an example data storage medium (such as a recording disc) being read by a reading and writing device, comprising an auxiliary structure.

FIG. 20 is a drawing of an example data storage medium 2000 (such as a recording disc) being read by a reading and writing device 2001, comprising an auxiliary structure 2003. As with other auxiliary data storage devices set forth in the present application, auxiliary structure 2001 may comprise or be attached to or connected with an auxiliary reference pattern 2005. As data is read into a temporary memory, from medium 2000, it may be interpolated with, added to, or factored with data from paired sections of the referenced pattern 2005, yielding a more robust data set, in some embodiments.

It is within the scope of this invention that medium 2000 is an analogue data storage medium, and more direct physical reactions (e.g., chemical, electromechanical, physical, optical) interactions between pattern 2005 and the data stored on the medium may occur within read/write device 2001.

In any event a more complex data set is yielded, via the interaction or interaction taking place within local data storage device 2006, in some embodiments.

Although the exemplary data storage techniques discussed above have utilized, by-and-large, magnetic and optical storage media, it will be apparent to those with skill in the art that they are equally applicable to any known and many not yet known data storage media. For example, data storage systems using physical objects, such as punch cards, or chemical signatures, such as D.N.A., may also be used. In these contexts, a cascade of physical events or reactions (and pattern thereof) leading from the physically or chemically written domain and a surrounding structure of any size, shape or physical pattern may be the surrounding structure event leading to a more complex data set, yielded by the physical/mechanical or chemical data storage unit.

I claim:

1. A device for data storage, comprising:

a reading and writing device configured to read and write a plurality of portions of a data storage medium, wherein said plurality of portions of a data storage medium are configured to be read and written with stored data; and a structure comprised in and/or auxiliary to said reading and writing device which reads and reacts with said plurality of portions of a data storage medium and/or the stored data, after said plurality of portions of a data storage medium have been written with the stored data, and thereby produces different data than the stored data, from the stored data;

wherein said portions of a data storage medium are written according to the different data produced from said stored data; and wherein said auxiliary structure comprises a magnetic and/or optical pattern yielding the different data.

2. The device for data storage of claim 1, wherein said magnetic and/or optical pattern is an optical pattern.

3. The device for data storage of claim 1, wherein said magnetic and/or optical pattern is a magnetic pattern.

4. The device for data storage of claim 1, wherein said plurality of portions of a data storage medium comprise data storage cells.

5. The device for data storage of claim 1, wherein said plurality of portions of a data storage medium comprise data symbols.

6. The device for data storage of claim 1, wherein said plurality of portions of a data storage medium comprise an analog data storage medium.

7. The device for data storage of claim 1, wherein said pattern is random.

8. The device for data storage of claim 1, wherein said pattern is at least partially non-random.

9. The device for data storage of claim 1, wherein said pattern progresses geometrically and/or algorithmically.

10. The device for data storage of claim 1, wherein said pattern yields said different data when said pattern is read according to a geometric progression or according to a known equation or other expression.

11. A system for data storage, comprising:

a control system, comprising computer software and hardware, including:

a reading and writing device configured to read and write a plurality of portions of a data storage medium, wherein said plurality of portions of a data storage medium are configured to be read and written with stored data; and an auxiliary structure which interacts with said plurality of portions of a data storage medium and/or the stored data during a reading of the stored data by said reading and writing device, and thereby produces different data than said stored data, from the stored data;

wherein said portions of a data storage medium are written according to the different-data produced from said stored data; and wherein said auxiliary structure comprises a magnetic and/or optical pattern yielding the different data.

12. The system for data storage of claim 11, wherein said magnetic and/or optical pattern is an optical pattern.

13. The system data storage of claim 11, wherein said magnetic and/or optical pattern is a magnetic pattern.

14. The system for data storage of claim 11, wherein said plurality of portions of a data storage medium comprise data storage cells.

15. The system for data storage of claim 11, wherein said plurality of portions of a data storage medium comprise data symbols.

16. The system for data storage of claim 11, wherein said plurality of portions of a data storage medium comprise an analog data storage medium.

17. The system for data storage of claim 11, wherein said pattern is random.

18. The system for data storage of claim 11, wherein said pattern is at least partially non-random.

19. The system for data storage of claim 11, wherein said pattern progresses geometrically and/or algorithmically.

20. The system for data storage of claim 11, wherein said pattern yields said different data when said pattern is read according to a geometric progression or according to a known equation or other expression.

* * * * *